May 20, 1930.  G. LOENING  1,759,652
RETRACTABLE LANDING GEAR
Filed June 29, 1929   5 Sheets-Sheet 3
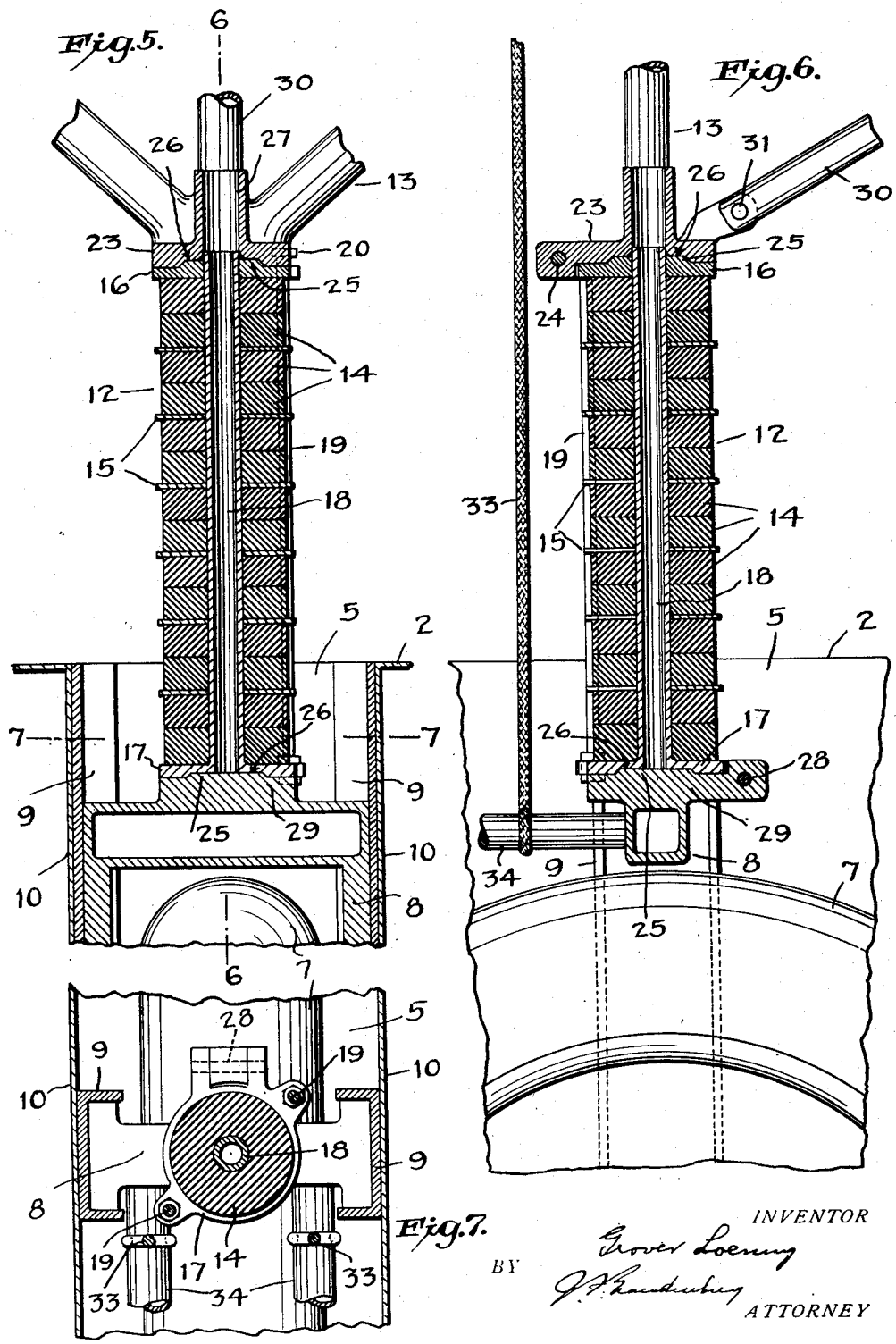
INVENTOR
Grover Loening
BY
ATTORNEY May 20, 1930. G. LOENING 1,759,652
RETRACTABLE LANDING GEAR
Filed June 29, 1929  5 Sheets-Sheet 5

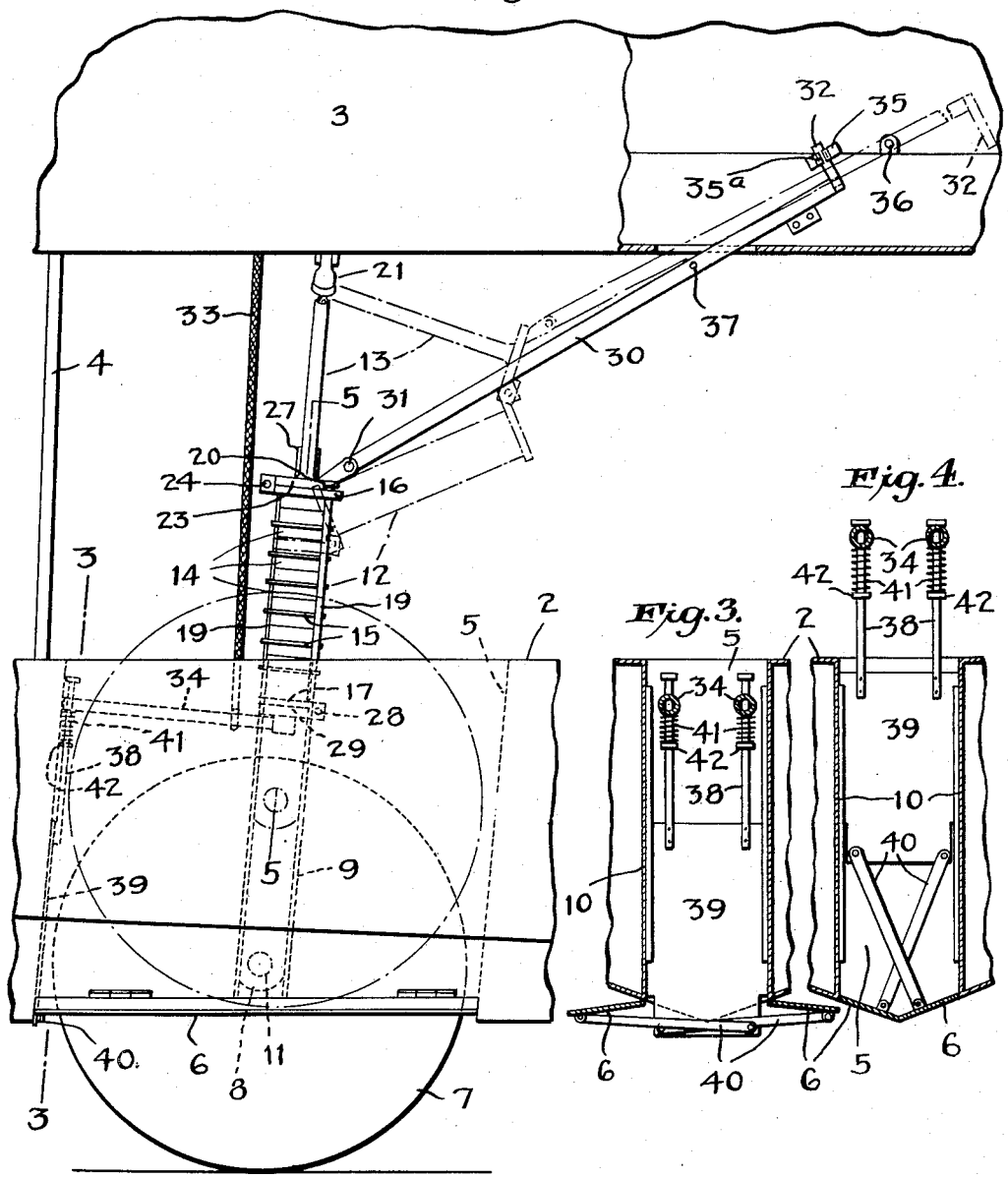

INVENTOR
Grover Loening
BY
ATTORNEY

Patented May 20, 1930

1,759,652

UNITED STATES PATENT OFFICE

GROVER LOENING, OF NEW YORK, N. Y.

RETRACTABLE LANDING GEAR

Application filed June 29, 1929. Serial No. 374,732.

The invention relates to retractable landing gears for airplanes, more particularly for seaplanes, flying-boats and the like.

The general object of the invention is to provide a retractable landing gear of simple, effective and inexpensive construction, and convenient to operate. The landing gear is raised and lowered by a simple lever or toggle system operated by a push and pull rod having a handle in reach of the pilot, but other operating means may be employed.

A further object is to provide a landing gear in which the main strength strut is divided into folding parts and includes means whereby the folding parts will be automatically locked so as to take the landing load. The break in the main strut which allows the landing gear to be retracted is made possible by an offset hinge device which causes the strut to be self-locking when straightened out and under load.

Another object is to incorporate highly effective shock-absorbing means in the foldable main strength strut, the construction being of an inexpensive nature and well adapted to the general plan.

Still another object is to provide a landing gear that can be very rapidly lowered or raised.

Another object is to provide simple and practical means combined with the landing gear for operating bottom doors of a wheel pocket automatically with the operation of the landing gear.

Other objects and features of the invention will become apparent as the specification proceeds.

In the accompanying drawings forming part hereof:

Fig. 2 is a side elevation showing fragments of the center float and the body, the landing gear being shown in full lines in the same condition as in Fig. 1, and in retracted condition in dot and dash lines;

Fig. 3 is a section taken on the line 3—3 of Fig. 2;

Fig. 4 is a similar view showing the doors closed as in the retracted condition of the landing gear;

Fig. 5 is a section on the line 5—5 of Fig. 2;

Fig. 6 is a section taken on the line 6—6 of Fig. 5;

Fig. 7 is a section taken on the line 7—7 of Fig. 5;

Figure 1:
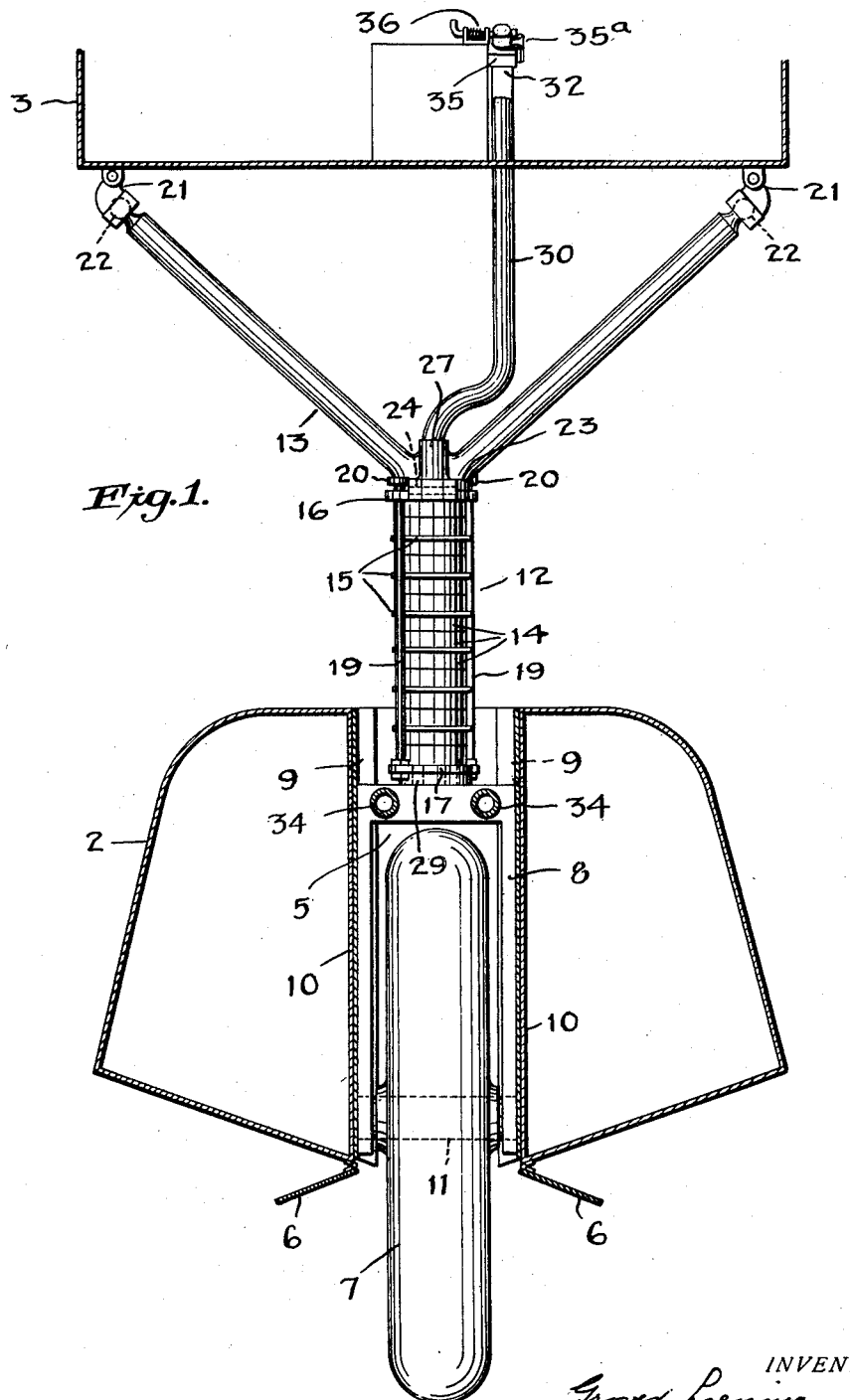
Fig. 1 is a vertical transverse section through a center float and the lower part of the body of a seaplane, showing the landing gear principally in elevation, the landing gear being protracted and shown as if under load, and the doors being open.
Figure 8:
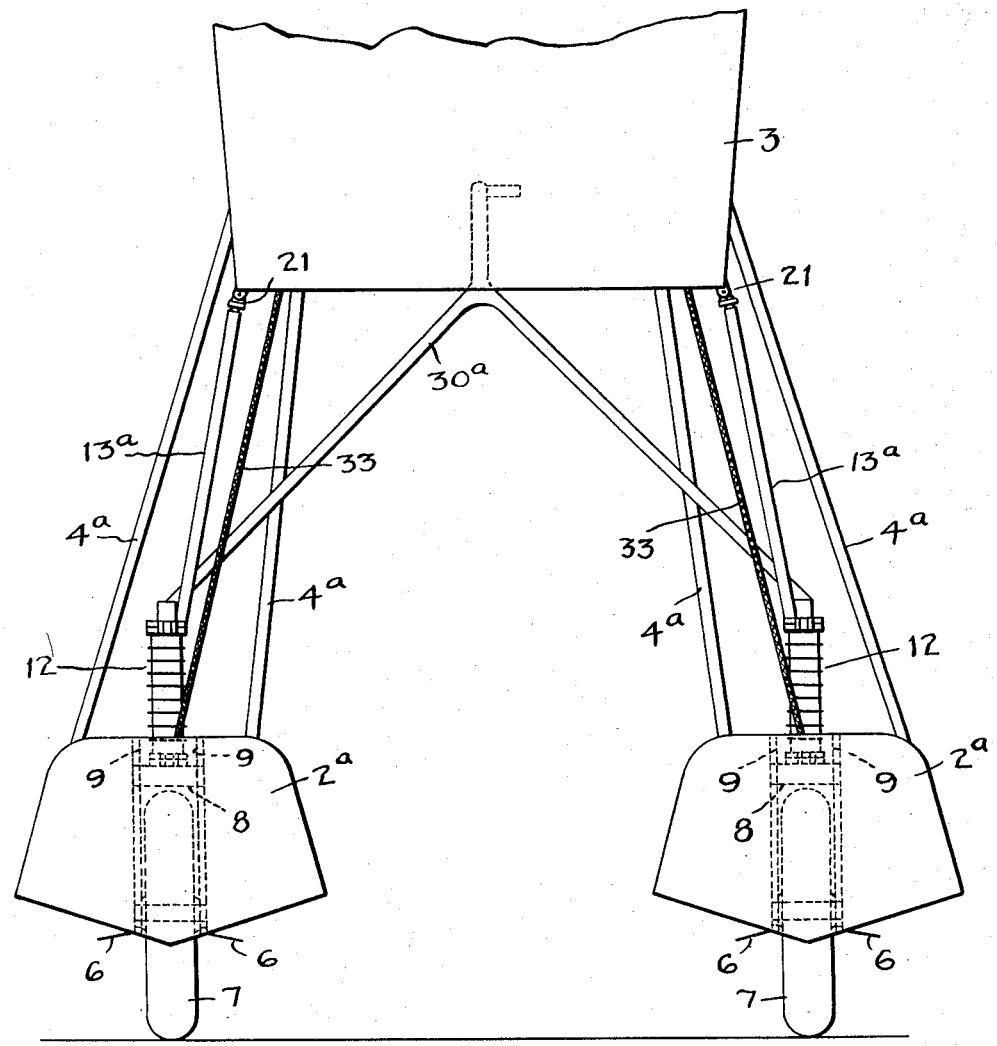
Figure 9:
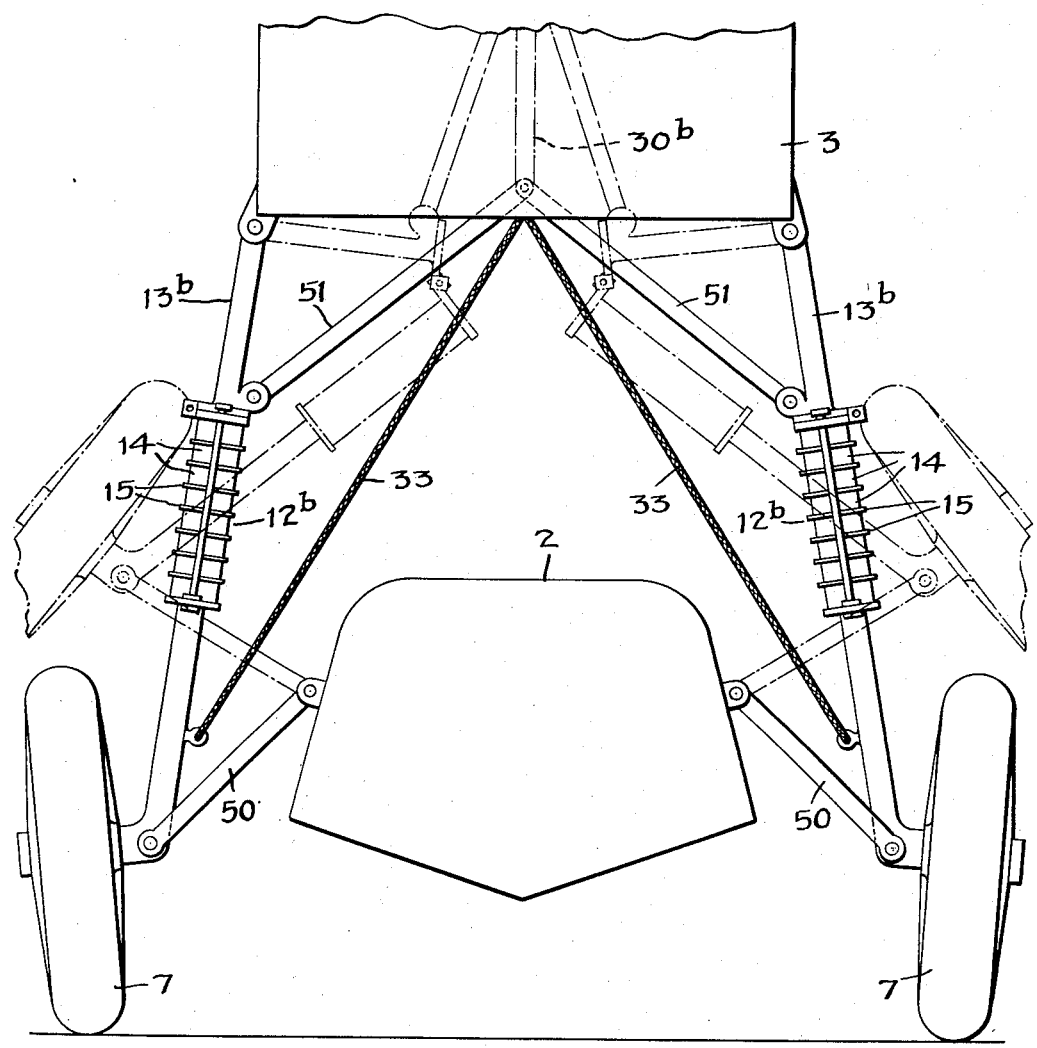

Fig. 8 is a front elevation of the lower part of a twin-float seaplane provided with a two-wheel landing gear embodying the invention; and Fig. 9 is a similar view of a center float machine having a two-wheel landing gear connected with the sides of the center float, the said landing gear constituting another embodiment of the invention and being shown in protracted and retracted positions in full lines and in dot and dash lines, respectively.

Figs. 1 to 7 will first be described.

These views indicate a machine of the form having a fuselage or body 3 and a center float or pontoon 2 supported below the body by suitable struts, part of which are schematically indicated at 4 in Fig. 2. It will be apparent to those skilled in the art that the parts 2 and 3 might be replaced by a unitary boat body and superstructure. The invention is not limited to the form of body, flotation part and other fixed structure of the plane, which may be of any suitable type.

The float 2 has a wheel pocket 5 which opens through the bottom of the float, and as illustrated also opens through the top. The bottom of this pocket is closed by doors 6 when the landing gear is retracted, these doors being hinged at the sides and meeting at the middle and adapted to form part of the general V-bottom of the float. These doors are shown closed in Fig. 4 and opened out laterally in Fig. 3.

In this form of the invention a single, central landing wheel 7 is carried by a slide fork 8, which is guided in a rectilinear guideway formed by channels 9 fixed to the inner sides of the side walls 10 of the pockets, the guideway being approximately vertical with an inclination ranging upward and rearwardly, downwardly and forwardly.

The axle 11 of the wheel is carried by the lower ends of the fork.

The main strength strut of the landing gear comprises, in addition to the fork 8, a folding toggle composed of members 12 and 13.

The lower member 12 is constructed as a shock absorber made with a stack of centrally perforated live rubber blocks 14 interleaved with washers 15. This shock-absorbing stack is confined between top and bottom plates 16 and 17 and laterally confined by a tube 18 which rises from the bottom plate and extends through the openings in all the resilient elements and into sliding engagement with an opening in the top plate 16. The confinement of the rubber blocks is completed by limit rods 19 rising from the plate 17 and extending through openings in the top plate 16. The upper ends of these rods have heads 20 to bear against the upper surfaces of said top plate, at which time the blocks are under initial compression. When the shock absorber is shortened as the result of taking the landing load, the tube 18 and the rods 19 slide in the plate 17. Thus, Figs. 1, 2, 5 and 6 show the upper end of the tube and the heads of the rods pressed upward somewhat above the positions which they occupy when the landing gear is protracted but not under load.

The upper member 13 of the toggle is a broad V structure, the ends of the limbs of which are swingingly connected with transversely spaced fittings 21 on the under side of the body 3. The flexible joints 22 may be in the nature of ball and socket connections, but there being two of them the effect is that of a hinge having an axis transverse of the machine, so that the member 13 swings rearward and upward from its sustaining position, and forward and downward when the landing gear is protracted.

Fixed on the lower end of the member 13 there is an abutment plate 23, which bears solidly against the plate 16, forming a cooperating abutment, when the toggle is straightened out. These two plates are hinged together on a transverse axis offset forwardly of the axes or thrust lines of the strut members. The hinge pintle is marked 24. The plates 16 and 23 may be provided, respectively, with a boss 25 and a recess 26 which interfit when the strut is straightened, thereby contributing to the lateral strength of the joint. The plate 23 may also have a central tube or opening 27 to receive the upper end of the tube 18 when the shock absorber is shortened by reason of the landing load.

The lower end of the member 12 is hinge jointed to the top of the fork 8, this hinge preferably being similar in type to the joint between the members 12 and 13. This hinge, however, is offset in a direction reverse to the offsetting of the joint just described, that is to say the pintle 28 of this hinge is offset rearward from the line of the thrust. The plate 17 and a portion 29 of the top of the fork constitute cooperating abutments after the manner of the plates 16 and 23, and these plates are also preferably provided with interfitting formations 25 and 26 such as have already been described.

A push and pull rod 30 is pivotally connected at 31 with the lower end of the upper toggle member 13. This rod extends upward and rearward into the interior of the body 3, where it is provided with a handle 32. The handle need not be directly on the push and pull rod, though that is preferable. By pulling upward and rearward on the pull rod the toggle is broken, all three flexible joints of the main strength strut are flexed, and the fork 8 is moved upward in its guideway, raising the wheel 7 above the bottom lines of the float 2. Pushing downward and forward on the rod 30 straightens the toggle and projects the wheel through the lower end of the wheel pocket a sufficient distance below the bottom of the float to make a landing. When the main strength strut is thus straightened it is automatically locked against "breaking" under the load, because of the offset hinge devices. The abutment plates coact in the line of thrust, saving the pintles 24 and 28 from stress. These abutment plates prevent the joints from flexing past the straightened condition of the strut when the landing gear is protracted, and permit the joints to flex in one direction only.

The weight of the landing gear is counterbalanced, or largely counterbalanced, by one or more elastic cables 33 which are stretched between the body 3 and rods 34 projecting forward from the top of the fork 8. These cables approximately equalize the effort required in raising and lowering the landing gear, so that the force required is little more than that necessary to overcome friction. The cables may also serve to hold the pairs of abutments 16, 23 and 17, 29 solidly against each other in the protracted condition of the landing gear before it receives the landing shock.

Means are preferably provided for holding or locking the push and pull rod in the protracted condition of the gear. For this purpose the handle 32 may be swiveled on the rod 30 so that it can be turned behind a shoulder or into a notch of a suitable fixture 35 in the interior of the body 3, where it may be retained by a clip 35ª. The fact of the rod 30 being held against rearward movement when the gear is protracted, together with the fact that the fork 8 is confined by its guide, will prevent the offset hinge devices from opening up under the weight of the gear irrespective of the action of any spring means. However, either a holding means for the push and pull rod (or some anterior part connected with this rod) or spring means, or both may be relied upon to keep the hinge abutments closed together preparatory to landing.

It will be understood that the holding means 35, 35ᵃ for the operating means is not required to take the landing thrust. That thrust is transmitted to the fixed structure of the plane entirely through the self-locking strut or toggle mechanism, and does not act through the rod 30. The means for holding this rod in position after protracting the gear may be of any character, and might even be omitted. The presence of such means is a desirable safeguard against the hinges opening up under the weight of the gear before a landing is made.

For the purpose of retaining the gear in the retracted condition, a spring bolt 36 is shown, to enter a hole 37 in the rod 30, but any other suitable means may be employed.

The rods 34 have openings through them at their forward ends, and slidably fitted in these openings are headed rods 38 extending upward from a plate 39 which is slidably guided at the front of the wheel pocket. The lower end of this plate is connected with the doors 6 by links 40, in such manner that when the plate is depressed by the straightening of the main strength strut which projects the wheel, the doors are moved open, whilst when the landing gear is retracted the doors are closed following the raising of the wheel into the pocket.

The slidability of the rods 34 relatively to the rods 38 affords an element of lost-motion which keeps the doors from being swung inward against the wheel when the latter is pressed partly into the pocket by the landing load, and also prevents the doors being closed against the wheel while the latter is being retracted. Springs 41 are preferably interposed between the rods 34 and collars 42 on the rods 38. These springs also tend to keep the offset hinge devices of the main strength strut closed prior to landing, and may be relied upon for that purpose.

It will be understood that a plane having the single wheel landing gear which has been described will be provided with side skids or other known side balancing devices, not necessary to illustrate.

Fig. 8 shows a two-wheel landing gear, the wheels 7 of which are mounted in pockets of twin pontoons 2ᵃ carried from the body 3 by suitable struts 4ᵃ. Each wheel is carried by a fork 8 slidably guided in the manner already described and having a shock-absorber toggle member 12 hinged to it as in the other case. The two members 12 are hinged to upper toggle members 13ᵃ which are swingingly connected at 21 to the body 3. The joints between the toggle members 12 and 13ᵃ and between the members 12 and the forks have the self-locking feature previously described. The lower ends of the toggle members 13ᵃ are pivotally connected to a forked push and pull rod 30ᵃ, which is common to the two sides of the landing gear. This push and pull rod may be operated and held in the same way as the rod 30 of the other form.

Fig. 9 illustrates the application of the invention to a two-wheel landing gear of the kind in which the wheels are disposed outside of the float or floats and are connected therewith by laterally swinging links. In this case the axles of the wheels are on the lower ends of toggle members 12ᵇ, which have shock absorbers built into them in the manner which has been described. These members are connected with the opposite sides of the float 2 by links 50, which guide the wheel-carrying members in the protracting and retracting operations, and take lateral and rearwardly acting stresses on landing, thus performing the general functions of the rectilinear guides of the other forms of the invention.

The upper toggle members 13ᵇ are connected to the lower toggle members 12ᵇ by the same form of offset hinge with abutments, as in the case of the members 12 and 13 first described, only in this instance the hinge pintle is offset outward from the line of thrust through the main strength strut. The members 13ᵇ are pivotally connected with the body 3, the axes about which these joints flex being fore and aft instead of transverse. Pivotal links 51 connect the members 13ᵇ with a push and pull rod 30ᵇ.

Other modifications and embodiments of the invention will readily suggest themselves.

I claim:

1. A retractable landing gear comprising a wheel carrying part, a foldable main strength strut connected therewith and containing an offset hinge device causing said strut to be self-locking when straightened to protract the wheel, and operating means comprising a push and pull rod connected with said main strength strut to fold and straighten the same.

2. A retractable landing gear comprising a wheel-carrying part, a foldable main strength strut connected therewith and containing an offset hinge device causing said strut to be self-locking when straightened to protract the wheel, operating means comprising a push and pull rod connected with said main strength strut to fold and straighten the same, and means for holding said operating means in the protracted condition of the gear.

3. A retractable landing gear as set forth in claim 1, further characterized in that a section of said foldable main strength strut is constituted as a shock-absorber.

4. A retractable landing gear as set forth in claim 1, further characterized in that a section of said foldable main strength strut comprises a stack of elastic elements with relatively movable members confining them and affording lateral stiffness.

5. In an airplane, a retractable landing gear comprising a wheel-carrying part, means for guiding the same, a foldable main strength strut comprising a toggle having its upper member connected with the fixed structure of the airplane and its lower member connected with said wheel-carrying part, an offset hinge device connecting the toggle members whereby the toggle is self-locking when straightened, and means for folding and straightening said toggle.

6. A retractable landing gear comprising a slidable wheel-carrying part, a guideway for said part, a foldable main strength strut comprising a toggle the upper member of which is connected to a fixed part, an offset hinge device connecting the toggle members with each other, a reversely offset hinge device connecting the lower member with the wheel-carrying part, and means for folding and straightening said toggle.

7. A retractable landing gear comprising a wheel-carrying part, means for guiding said part, a foldable main strength strut comprising an upper member flexibly connected with a fixed part and a lower member flexibly connected with said wheel-carrying part, an offset hinge device connecting said members so that they are self-locking in the extended condition, and means for folding and extending said strut.

8. A retractible landing gear comprising a wheel-carrying part, means for guiding said part, a foldable main strength strut the upper member of which is flexibly connected with a fixed part, an offset hinge device connecting the members of said toggle with each other, a reversely offset hinge device connecting the lower member of the toggle with the wheel-carrying part, and means for folding and extending said strut.

9. In an airplane, a retractable landing gear comprising a wheel-carrying part, means for guiding the same, a foldable main strength strut comprising a toggle having its upper member connected with the fixed structure of the airplane and its lower member connected with said wheel-carrying part, an offset hinge device connecting the toggle members whereby the toggle is self-locking when straightened, a shock-absorber incorporated in one of the members of the toggle, and means for folding and straightening the toggle.

10. In an airplane, a retractable landing gear comprising a wheel-carrying part, means for guiding the same, a foldable main strength strut comprising a toggle having its upper member connected with the fixed structure of the airplane and its lower member connected with said wheel-carrying part, an offset hinge device connecting the toggle members whereby the toggle is self-locking when straightened, a shock absorber incorporated in the lower member of the toggle, and operating means connected with the upper member of the toggle.

11. In an airplane, a retractable landing gear comprising a wheel-carrying part, means for guiding the same, a foldable main strength strut comprising a toggle having its upper member connected with the fixed structure of the airplane and its lower member connected with said wheel-carrying part, an offset hinge device connecting the toggle members whereby the toggle is self-locking when straightened, a shock-absorber incorporated in the lower member of the toggle, and operating means comprising a push and pull rod connected with the upper member of the toggle.

12. A retractable landing gear comprising a wheel-carrying part, a foldable main strength strut connected therewith and containing an offset hinge device causing said strut to be self-locking when straightened, means for operating said toggle, and elastic counterbalance means connected with the landing gear.

GROVER LOENING.